United States Patent [19]

Hisey

[11] Patent Number: 5,191,618
[45] Date of Patent: Mar. 2, 1993

[54] ROTARY LOW-FREQUENCY SOUND REPRODUCING APPARATUS AND METHOD

[76] Inventor: Bradner L. Hisey, 19325 Athos Pl., Saratoga, Calif. 95070

[21] Appl. No.: 632,047

[22] Filed: Dec. 20, 1990

[51] Int. Cl.$^5$ .......................................... H04R 25/00
[52] U.S. Cl. ................... 381/158; 381/165; 340/390; 340/404
[58] Field of Search ............... 381/165, 158; 340/388, 340/390, 391, 404

[56] References Cited

U.S. PATENT DOCUMENTS

| | | | |
|---|---|---|---|
| 1,333,703 | 3/1920 | Brinks | 340/390 |
| 1,714,516 | 5/1929 | Milecz | 381/156 |
| 4,564,727 | 1/1986 | Danley et al. | 381/162 |
| 4,763,358 | 8/1988 | Danley | 381/156 |
| 4,864,276 | 9/1989 | Tribbey et al. | 340/404 |

Primary Examiner—Jin F. Ng
Assistant Examiner—Huyen D. Le
Attorney, Agent, or Firm—Flehr, Hohbach, Test, Albritton & Herbert

[57] ABSTRACT

Apparatus for reproducing low frequency sound in response to an applied audio signal having a rotary acoustic radiator comprised of an enclosure having a cylindrical sidewall and end walls adjoining the sidewall and forming a cylindrical chamber. A rotor assembly including a hub and movable vanes secured to the hub is rotatably mounted in the chamber for rotation on a longitudinal axis. Stationary vanes are mounted in the chamber and extend between the cylindrical sidewall and the hub and extend between the end walls. The enclosure has ports therein opening into the chamber and disposed adjacent the stationary vanes on opposite sides of said stationary vanes. The movable vanes are disposed on opposite sides of the stationary vanes and extend between the cylindrical sidewall and the hub and between the end walls. A torque motor is provided for applying rotational reciprocating movement to the rotor assembly whereby upon rotation in one direction air is forced out through the ports on one side of the stationary vanes and upon rotation of the rotor assembly in an opposite direction air is forced through the ports on the other side of the stationary vanes. A position sensor is provided for sensing the rotational position of the rotor assembly. A microcomputer is provided for controlling the reciprocating movement of the torque motor in response to the applied audio signal.

39 Claims, 4 Drawing Sheets

ROTARY LOW-FREQUENCY SOUND REPRODUCING APPARATUS AND METHOD

The invention relates to a rotary low frequency sound reproducing apparatus and method and more particularly to a computer-aided rotary electromechanical transducer and method for reproduction of sound in the first two octaves of the audible frequency spectrum.

BACKGROUND OF THE INVENTION

The reproduction of the first two octaves of audible low-frequency sound, from 20 to 80 Hz, is a longstanding problem in that large volumes of air must be moved. For a given loudness of a reproduced low-frequency sound, the air volume moved must be doubled for each halving of reproduced sound frequency.

Many solutions have been attempted. Low-frequency loudspeakers with highly-compliant suspensions have been used. However, the long cone travels needed are difficult to achieve with linearity. Nonlinearities introduce intermodulation distortion, the modulation of higher reproduced frequencies by lower reproduced frequencies. More serious attempts to produce the lowest frequencies in sound isolate the lower two octaves from higher frequencies for reproduction through "subwoofer" loudspeakers.

Direct radiator voice-coil-and-cone loudspeakers, which have at best an efficiency of a few percent, have been used as subwoofers in 12 to 30 inch frame sizes in large cabinets of several cubic feet in volume. Required driving powers are also large, typically several hundred watts. Their low-frequency response is limited by resonance of the voice-coil-and-cone masses in combination with compliance of the voice-coil support "spider", the cone flexible surround, and the air compliance of a closed cabinet, if used. Together these set an effective lower limit to the frequencies of output sound since it is difficult to drive a loudspeaker below its low-frequency resonance. Closed-loop servomechanisms controlling voice-coil movements have been used to reduce these effects but they may leave the cone and flexible surround free to flex in unwanted modes at high amplitude, limiting usable power output by the onset of distortion.

In auditoria and stadia, horn-type radiators driven by fairly conventional voice-coil-and-cone transducers have also been used as subwoofers with efficiencies in the 30 to 50 percent range. Their limitation in the domestic environment is that for reasonable performance the perimeter of the horn mouth must be of the order of the wavelength of the lowest reproduced sound, e.g., over 50 feet at 20 Hz. Recently, horns of the type disclosed in U.S. Pat. No. 4,564,727 have been driven from externally cooled servomotors through pulley, belt, and cone arrangements, achieving remarkable sustained acoustic outputs.

Most recently, in U.S. Pat. No. 4,763,358, the use of a positive-displacement rotary-vane pump is disclosed. If of suitable size it should be able to produce usable output to and below the 20 Hz limit of audibility. The rotary vane pump may be used to drive a horn, though the required horn mouth size (above) practically excludes it from the domestic user environment. If used as a direct radiator, rotary vane pump efficiency is similar to that of voice-coil-and-cone direct radiators. At high output, most of the input power must be dissipated as heat, usually from within a closed cabinet. Though the volumetric efficiency is high relative to that of voice-coil-and-cone loudspeakers, since much of the device volume may be swept by the vanes, the devices and their cabinetry can be large. Cabinetry structure for devices having only full-length ports in pump-enclosure sidewalls is awkward. Motor wear and noise, bearing noise, and seal-leakage noise can be problematic in a quiet, e.g., home or auto, user environment. Port-turbulence noise must be managed—a nominal 15 inch diameter, 9 inch long rotary acoustic radiator moves about 6 times the air volume in a single stroke as does a conventional 15 inch loudspeaker.

Position sensing (directly, or indirectly by tachometers or accelerometers) has heretofore been disclosed for rotary acoustic radiators to provide negative feedback information active in the same frequency band as the acoustic output, to linearize vane travel. This approach has been used successfully in voice-coil-and-cone loudspeakers, which are linear at null or neutral position. Rotary acoustic transducers are not linear at null. The support bearings of rotary devices have static friction differing several fold from dynamic friction, and both static and dynamic friction vary with temperature and time. Dynamic friction, determined more by grease seals than by the bearings themselves, increases with rotational velocity. Stability is difficult to assure with such components within a negative feedback loop.

Bearing, slip ring, and motor-brush static friction induce distortion at low output amplitudes. Total breakaway (from stop) torques, which are typically 2 percent of full motor torque, are 20 percent of torque when the audio output level is down 20 db, and further increase the relative distortion level with decreasing output. Since the usual dynamic range of entertainment audio is 40 to 50 db, such distortions at mid and low amplitudes are serious problems. Commutation discontinuities and irregularities of motor magnetic fields also contribute somewhat unpredictably to low-amplitude output distortion, as their magnitude is a discontinuous function of motor armature rotational position.

There is therefore a need to address these problems of low-frequency sound transducers, and in particular rotary-vane transducers, to produce a low-frequency sound reproducing apparatus and method more suitable for the consumer environment.

OBJECTS OF THE INVENTION

In general, it is an object of the present invention to provide a low-frequency sound producing apparatus and method which is capable of producing sounds in the lowest frequency range of the audible spectrum and below the audible spectrum.

Another object of the invention is to provide a low frequency sound producing apparatus and method of the above character in which a rotary acoustic radiator assembly is used.

Another object of the invention is to provide a low-frequency sound producing apparatus and method of the above character in which the rotary acoustic apparatus is without intrinsic low-frequency resonances.

Another object of the invention is to provide an apparatus and method of the above character in which the frequency response is substantially flat and without resonances throughout the 20 to 80 Hz nominal working bandwidth and for at least one additional octave below 20 Hz without the use of negative feedback.

Another object of the invention is to provide an apparatus and method of the above character which is volumetrically efficient in that it can displace a large fraction of its internal volume in a single stroke.

Another object of the invention is to provide an apparatus and method of the above character in which maximum volumetric efficiency of the rotary acoustic radiator assembly is achieved for a given or predetermined envelope.

Another object of the invention is to provide an apparatus and method of the above character in which the rotary acoustic radiator assembly has forward (user side) and back (cabinet) sides with ports therein.

Another object of the invention is to provide an apparatus and method of the above character in which the user-side and back-side ports subtend angular sectors about the apparatus axis which may overlap.

Another object of the invention is to provide an apparatus and method of the above character in which noises from all sources produce signal-to-noise ratios which are acceptable.

Another object of the invention is to provide an apparatus and method of the above character in which motor brushes or slip rings, and the noise, wear, distortion, and nonlinearities associated with them, are substantially eliminated.

Another object of the invention is to provide an apparatus and method of the above character in which kinetic energy of air exiting through ports on the user side of the apparatus is converted largely into the potential energy of an acoustic wave without use of a traditional exponential horn.

Another object of the invention is to provide an apparatus and method of the above character in which sources of distortion within the apparatus are quantified and subsequently corrected by computer operation on applied audio signals inputted to the apparatus during sound reproduction.

Another object of the invention is to provide an apparatus and method of the above character in which air transported by the rotary acoustic radiator assembly is used to provide drive torque motor cooling.

Another object of the invention is to provide an apparatus and method of the above character in which heat transfer from the driving torque motor is actively managed in the absence of a large applied audio signal.

Another object of the invention is to provide an apparatus and method of the above character in which distribution of bearing wear is actively managed.

Another object of the invention is to provide an apparatus and method of the above character in which apparatus nonlinearities arising in the torque motor, bearings, seals, and cabinetry are managed by using a microcomputer and position sensor which measures nonlinearities and retains the information in a microcomputer which adds correcting signals to the applied audio signal.

Additional objects and features of the invention will appear from the following description in which the preferred embodiments are set forth in conjunction with the accompanying drawings.

DESCRIPTION OF THE PREFERRED EMBODIMENTS

The rotary acoustic transducer apparatus of the present invention is used for producing low frequency sound in response to an applied audio signal. It is comprised of a rotary acoustic radiator assembly, a torque motor, a position sensor and a microcomputer. The apparatus may also be provided with a supporting cabinet. The radiator assembly comprises a generally cylindrical means with a cylindrical side wall and end walls forming a cylindrical chamber having an axis. A shaft is provided. Bearings mount the shaft in the cylindrical means for rotation about said axis. A cylindrical hub is secured to the shaft and extends between the end walls. Movable vanes are secured to the shaft. The shaft and hub and movable vanes form a rotor assembly. Stationary vanes are mounted in the chamber between said moving vanes and extend between the cylindrical side wall and the hub and between the end walls. The cylindrical means has ports opening through the cylindrical chamber walls to permit air flow into and out of the cylindrical chamber in response to movement of the movable vanes. A torque motor is coupled to the shaft for applying rotational reciprocating movement to the movable vanes. A position sensor ascertains the position of said rotor assembly. A microcomputer is provided and is coupled to the torque motor and to the position sensor and controls the operation of the torque motor in accordance with the applied audio signal. Nonlinearities arising in the torque motor, bearings, seals, and cabinet are measured by the position sensor and microcomputer and correcting signals created to modify the applied audio signal. Displaced air is used as a torque motor coolant. A diffuser-attenuator slows user-side airflows and permits small user-side ports to be used, increasing volumetric efficiency. The diffuser-attenuator is fabricated partially of acoustically-absorbent materials to attenuate vane-edge leakage noise and port-turbulence noise.

Figures 1, 2:
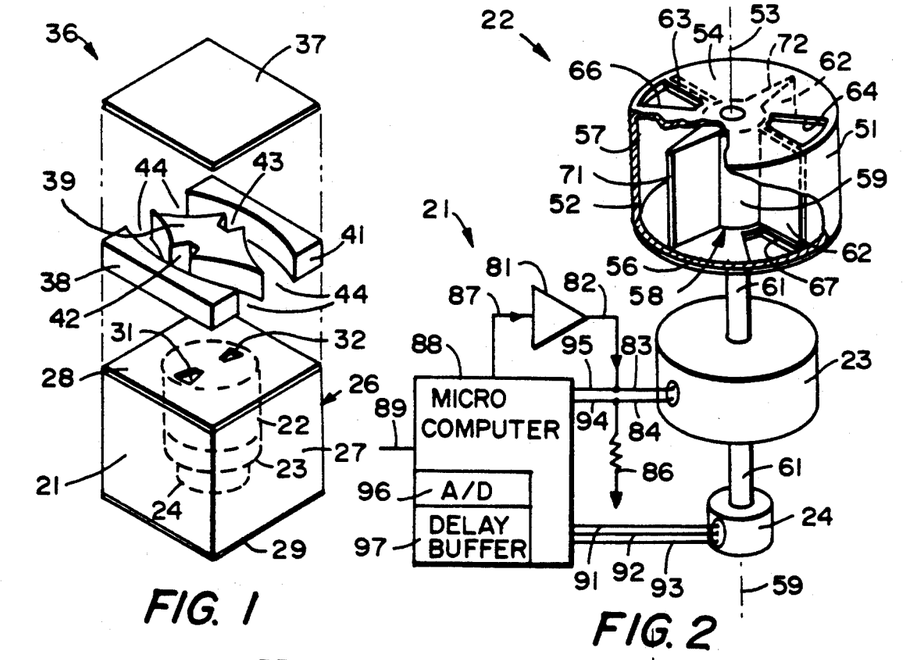
FIG. 1 is a partially exploded, isometric view of a loudspeaker cabinet incorporating the rotary acoustic transducer apparatus incorporating the present invention.
FIG. 2 is a schematic isometric exploded view of the rotary acoustical transducer apparatus with certain portions broken away and its control system.

More particularly, as shown in FIG. 1 of the drawings, the rotary low-frequency sound producing apparatus 21 which alternatively can be called a rotary acoustic transducer apparatus is comprised of rotary acoustic radiator assembly 22, a torque motor 23 and a position sensor 24, said apparatus typically being supported by a cabinet 26. A typical cabinet 26 is provided with four side walls 27, a top wall 28 and a bottom wall 29 to form a rectangular cabinet or enclosure. The top wall 28 is provided with ports 31 and 32. The rotary acoustic radiator assembly 22 is secured to the wall 28 by suitable means, such as bolts (not shown) so that the ports 31 and 32 in the cabinet top wall 28 register with the ports hereinafter described in the rotary acoustic radiator assembly 22. Cabinet minimum volume is in the range of five to ten times the maximum air volume which may be displaced by the rotary acoustic radiator assembly 22 in a single stroke of the rotary acoustic radiator assembly 22.

A diffuser-attenuator 36 is comprised of a top planar baffle 37 overlying and spaced upwardly from the cabinet top wall 28. The top baffle 37 has approximately the same area as the top wall of the cabinet 26, and is spaced upwardly from the cabinet top wall 28 a suitable distance, as for example one forth of the diameter of the rotary acoustic radiator assembly diameter 22. Fixed air duct baffle means 38, 39, and 41 are provided between the top baffle 37 and the cabinet top wall 28. The top baffle 37 is supported on the cabinet top wall 28 by spacer and bolt assemblies (not shown) placed as appropriate to support the top baffle 37 and inhibit vibration of the top baffle 37. Air from the ports 31 and 32 enters the diffuser-attenuator 36 through slots 42 and 43 and is redirected so that it exits in the four mouths 44 in the diffuser-attenuator between the top baffle 37 and cabinet top wall 28. Air exiting from the ports 31 and 32 of the cabinet 26 can have considerable kinetic energy, which as the air passes through the diffuser-attenuator 36 is converted to potential energy in a sound wave. Air entering the ports 31 and 32 is driven by the potential energy of ambient air pressure and is shaped into a rapidly-moving air column. Though nomenclature is similar, no attempt is made to make the diffuser-attenuator 36 function as a traditional acoustic horn radiator.

FIG. 2 is a schematic illustration of the low-frequency sound reproducing apparatus 21 without a cabinet 26. As shown, the rotary acoustic radiator assembly 22 consists of a right circular cylinder or enclosure 51 formed by a cylindrical sidewall 52 which has a longitudinal axis 53. First and second or top and bottom spaced apart parallel circular end walls 54 and 56 adjoin the cylindrical sidewall 49 to form a closed cylindrical chamber 57. A rotor assembly 58 is mounted in the right circular cylindrical chamber 57 and is comprised of a cylindrical hub 59 which is adapted to rotate on the longitudinal axis 53 coaxial with the cylindrical sidewall 52 by a shaft 61. The cylindrical hub 59 extends between the first and second end walls 54 and 56 and is rotatably carried by the shaft 61. The shaft 61 extends coaxially of the hub 59 and is rotatably mounted in the end walls 54 and 56 by suitable anti-friction bearings (not shown). In the embodiment of the invention shown in FIG. 2, the shaft 61 extends through the second end wall 56 for a purpose hereinafter described. It should be appreciated that if desired, the shaft 61 can be formed in two parts and need not necessarily extend through the hub 59. For example, the two parts may be secured to opposite ends of the hub 59.

First and second stationary vanes 62 and 63 (see FIGS. 2 and 3) are mounted within the chamber 57 of the right circular cylinder means 51 and extend radially of the chamber 57 between the cylindrical sidewall 52 and the hub 59 and between the first and second end walls 54 and 56. Thus, as shown the stationary vanes 62 and 63 can be secured to the cylindrical sidewall 52 and the first and second end walls 54 and 56 and can extend into very close proximity to the hub 59 but not touching same so as to frictionally engage the hub and impede rotational movement of the rotor assembly 58.

Figure 3:
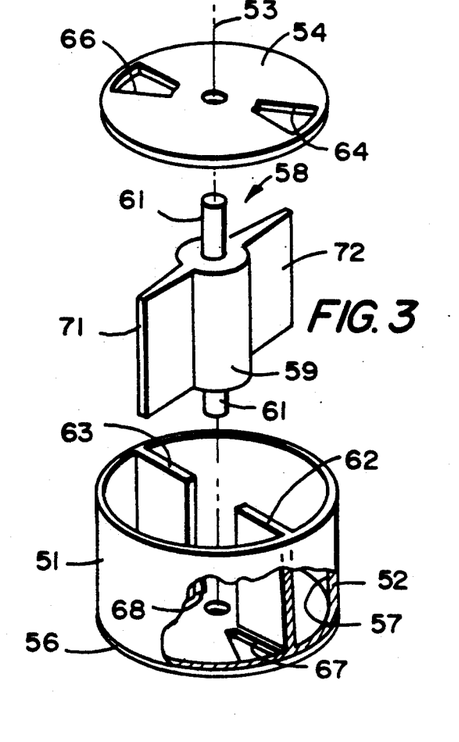
FIGS. 3 through 8 are exploded isometric views of the rotary acoustic radiator assembly with certain portions being broken away.

First and second ports 64 and 66 in the form of radial sectors are provided in the first end wall 51 and are disposed counterclockwise adjacent to the stationary vanes 62 and 63. Thus, as shown in FIGS. 2 and 3, a port 64 is provided in end wall 54 adjacent to stationary vane 62 and a port 66 is provided in the end wall 56 adjacent to the stationary vane 63. In a similar manner ports 67 and 68 in the form of radial sectors are disposed in the second end wall 56 clockwise adjacent to stationary vanes 62 and 63, respectively. The ports 64, 66, 67 and 68 may have a wide variety of configurations, as described hereinafter.

The rotor assembly 58, in addition to the hub 59 and the shaft 61 includes first and second movable vanes 71 and 72 which are secured to the hub 59 and extend radially therefrom into very close proximity to the cylindrical sidewall 52. They also extend between the first and second end walls 54 and 56 but do not frictionally engage them. The movable vanes 71 and 72 may be tapered as shown to provide greater thickness and strength at the roots or proximal margins of the vanes to resist motor torque while being narrower at the tips or distal margins to provide low mass and hence low rotational moments of inertia. The movable vanes 71 and 72, which are subject to large accelerating torques from the torque motor 23 and large air pressure forces generated within a cabinet 26, must necessarily have a rigid structure. These rigid structures are not a source of harmonic distortion as are the more flexible cone and cone-surround components of a conventional loudspeaker.

The large hub 59 reduces the angle about the longitudinal axis 53 subtended by the thickness of the inner or axial margins of the stationary vanes 62 and 63 while containing the robust structure including the hub 59 securing the movable vanes 71 and 72 to the shaft 61. Most of the hub included volume may be structural foamed plastic which contributes little to the rotational moment of inertia of the rotor assembly 58.

The right circular cylinder 51 and the stationary vanes 62 and 63 and movable vanes 71 and 72 may be formed of a number of suitable materials such as metal or composites provided they are dimensionally stable and have closely matched thermal expansion characteristics. Use of the rotary acoustic radiator assembly 22 as a heat sink for the torque motor 23 favors the use of high-thermal-conductivity metal such as aluminum for these components.

The torque motor 23 serves as means for applying rotational reciprocating movement to the rotor assembly 58 through the shaft 61. The drive signal to the torque motor 23 is provided by a power amplifier 81 through lines 82 and 83 with a ground return line 84 connected to ground through a low resistance armature-current sampling resistor 86. A driving signal for the power amplifier 81 is provided on a line 87 from a microcomputer 88 which has as its primary input a low-frequency audio signal applied on line 89. The position sensor 24 provides position information of the rotor assembly 58 to the microcomputer 88 through lines 91 and 92. Another line 93 from the sensor 24 to the microcomputer 88 serves as a ground line. Armature current information is provided to the microcomputer 88 on a line 94 in the form of the voltage drop across resistor 86. Line 95 supplies to the microcomputer 88 the drive voltage applied to the torque motor 23.

The microcomputer 88 includes an A/D converter 96 for converting analog signals to digital signals for processing in the microcomputer 88. It also includes a delay buffer 97 for management of distortion, as described hereinafter.

Operation of the rotary transducer assembly 21 shown in FIGS. 2 and 3 may now be described. As the shaft 61 is rotated counterclockwise by the torque motor 23, the hub 59 and the movable vanes 71 and 72 secured thereto are moved to cause air to be drawn into (inducted into) the ports 64 and 66 at the first end wall 54 of the right circular cylinder 51 and air forced out of (exhausted from) the ports 67 and 68 on the second end wall 56 of the right circular cylinder means 51. When rotation of the hub 59 and the movable vanes 71 and 72 is reversed, air is exhausted from the ports 64 and 66 and inducted into ports 67 and 68. Air leakage between the movable vanes 71 and 72 and the cylinder sidewall 52 and the end walls 54 and 56 and between the stationary vanes 62 and 63 and the hub 59 is limited by providing very close fits between the same, typically one one-thousandth of the internal diameter of the cylinder sidewall 52.

When power is first applied the microcomputer 88, in conjunction with the analog to digital converter 96, the signal delay buffer 97, the position sensor 24 and the current-sensing resistor 86, performs a number of initializing functions, including a startup protocol, which are described below. Thereafter the applied audio signal is operated on by the microcomputer 88, and other signals are originated as necessary to protect the apparatus and produce minimal distortion in the reproduced sound. In the present invention, the techniques used are considered to be forward corrections as distinguished from negative feedback. Nominal digital sampling rate is 3000 samples per second.

Centering. The position sensor 24 provides a binary indexing signal on line 91 and rotor assembly 58 position information on line 92. The indexing signal on line 91 indicates that the rotor assembly 58 is on one side or the other of the operating centered (index) position. These indexing data and position data are sampled by the microcomputer 88. During the startup protocol the applied audio signal on line 89 is suppressed and a signal is generated in the microcomputer 88 to bring the rotor assembly 58 to center neutral (index) position in the rotary acoustic radiator assembly 22. Upon completion of the startup protocol the applied audio signal 89 is turned on. Thereafter a long term moving average departure of the rotor assembly 58 from the centered position is calculated in the microcomputer 88 from data from the position sensor 24 data and compared with the index position. The difference is used to create a low-amplitude infrasonic, i.e., below 20 Hz, biasing signal in the microcomputer 88, which is delivered to the torque motor 23 through line 87, the power amplifier 81, and lines 82 and 83, which slowly brings the average movable vane position to the center position.

Damage protection. To produce a requisite working bandwidth upper frequency of 80 Hz, motor torque is high and the rotor assembly 58 is made light. The potential for damage if movable vanes 71 and 72 are driven into stationary vanes 62 and 63 is serious. In this invention the position sensor 24 continuously measures the positions of movable vanes 71 and 72, and vane velocity is determined by differentiation of position data in the microcomputer 88. Sensed position and velocity data are compared with look-up table values in the microcomputer 88 and applied audio signal 89 operated on as necessary by the microcomputer 88 to brake, stop, or reverse the movable vanes 71 and 72 before contact with stationary vanes 62 and 63 can occur.

Torque motor linearization. It is not economically convenient to produce an uncommutated torque motor 23 with linear armature deflections of the 1 to 2 radians needed for a rotary acoustic radiator assembly. Sensitivity to driving current usually falls at large deflections and is a potential source of predominantly odd-order harmonic distortion. During the startup protocol of the rotary acoustic transducer apparatus 21, the torque motor 23 is stepped through its operational range of rotation in increments of a few degrees by signals generated in the microcomputer 88 and applied to the torque motor 23 via power amplifier 81. At each step a computer-generated signal is converted to a known quantum of drive current by the driver or power amplifier 81 and applied to the armature of the torque motor 23. This quantum, or pulse, produces an acceleration of the armature, which is detected by the position sensor 24 and microcomputer 88, and is a measure of torque motor current-to-torque sensitivity at that point. These data are stored in the memory tables of the microcomputer 88, forming a "map" of torque motor 23 sensitivity at each point in its rotational range which accounts completely for design structure and variations in materials and manufacture. This map is normalized to a table of gain corrections to be applied to the applied audio signal so that the transfer function from the applied audio signal 89 to rotor assembly torque is linear. In operation, the applied audio signal 89 and position data from the sensor 24 are sampled, correction-table values looked up, interpolation of table values performed if necessary, the audio signal adjusted, converted back to analog form if appropriate, and fed to line 87.

Cabinet volume correction. In an economical domestic-use design, the volume displaced by the rotary acoustic radiator 22 is a significant fraction of the volume of a supporting cabinet 26 (typically 10–20%). Air compliance within the cabinet 26 provides the primary force resisting motor torque. With changing position of rotor assembly 58, combined rotary acoustic changes. This is a nonlinear (hyperbolic) change and a source of even-order harmonic distortion of sound output at high levels. As part of the startup protocol the rotor assembly 58 is stepped through large excursions by signals on line 87 applied to the power amplifier 81 and to the torque motor 23. Positions are measured with the position sensor 24. The armature drive current required to achieve these positions is measured by sampling, in the analogue-to digital converter 96, the voltage drop across resistor 86 which appears on line 94. These data, together with the known displacement volume of the rotary acoustic radiator 22, are used by the microcomputer 88 to calculate and record the volume of cabinet 26. These data are stored in a computer memory table and used, together with instantaneous position data provided by position sensor 24, to adjust motor torque for changing combined air compliance of a cabinet 26 and the rotary acoustic radiator 22, producing a linear response of the rotor assembly 58 to the applied audio signal 89.

Seal leakage correction. Air will leak about the margins of the vanes 62 and 63 and 71 and 72, and around the ends of the hub 59. Leakage in the rotary acoustic radiator assembly 22 varies as a function of internal geometry resulting from manufacturing tolerances, e.g., eccentricity of the axis of the rotor assembly 58 within the enclosing cylinder sidewall 52. This leakage is most significant at low amplitudes and low frequencies, and is a source of distortion (which would not be corrected by position-derived negative feedback, if used). As part of the startup protocol the rotor assembly 58 is rotated slowly through its range by microcomputer-generated constant torque. Vane velocity, derived by differentiating the output of the position sensor 24 in microcomputer 88, is recorded in memory of microcomputer 88 as a surrogate of leakage. Mapping and adjustment of the applied audio signal 89 is done in the same manner as for torque motor nonlinearities, above.

Bearing static or breakaway friction. Antifriction bearings have very low static or breakaway (from stop) friction if operated with light oil and no shields or seals. So operated they would be shortlived in the subject user environment, as domestic air is dusty and pressure gradients appear across the bearings. Grease lubrication and shields or seals are regarded as necessary, but they may increase breakaway friction more than an order of magnitude. While bearings are stopped, this friction is present and overall gain through the rotary acoustic transducer apparatus is zero. The consequent dead zone or hysteresis is a significant source of distortion at low power output. The phenomenon is most serious when a grease-lubricated bearing is stopped for more than an instant, as the grease, pulled by capillary forces, tends to cup around the balls. On first movement away from the stopped position these cups must be penetrated by the balls, with resultant increased breakaway torque needed to overcome the breakaway friction. As part of the startup protocol of this invention, these frictions are measured using small microcomputer-generated signals which are converted to torque by the power amplifier 81 and torque motor 23. Bearing breakaway torques are detected by armature current through resistor 86 and the position sensor 24 at the moment of breakaway and stored in memory of the microcomputer 88. When the applied audio signal 89 stops and reverses at local waveform peaks, the previously derived small computer-generated signals are read from computer-memory tables of the microcomputer 88 and are added to the applied audio signal 89 to produce a momentary torque which overcomes bearing breakaway friction and reduces output distortion.

Breakaway torques are reproducible, influenced by temperature and by extent and velocity of rotation immediately preceding a stop, and by duration of the stop. After the startup protocol, breakaway torques continue to be sampled and recorded in memory tables of the microcomputer 88 as function of the extent and velocity of rotation. The tables are continuously updated, thus reflecting bearing temperature changes. These more complete tables are used to adjust the applied audio signal 89, as described above, after the startup protocol is complete.

In addition, to forestall the breakaway friction buildup with bearing stops described above, the normal stop-pause-start rotor assembly 58 sequence at the waveform peaks of the applied audio signal is forestalled by not permitting the bearings to remain in stopped positions. When the applied audio signal 89 would cause the bearings to stop and the position sensor means 24 and microcomputer 88 detects the approaching stop condition, the microcomputer 88 generates a infrasonic input to power amplifier 81 and torque motor 23 which causes the rotor assembly 58 and the bearings to continue to move slowly, forestalling grease-cup formation in the bearing races. When applied audio signal generated movement is resumed, the infrasonic input is attenuated to zero. Thus the bearings accelerate either from an already-moving state or reverse instantaneously. In the first case static or breakaway friction is eliminated. In the second case it is stabilized and minimized. Friction offsetting torques are computer-generated and added to audio signals as described above.

To facilitate management of said friction forestalling infrasonic signals a delay interval of a few milliseconds from the delay buffer 97 is applied to the applied audio signal 89 before transmission to the power amplifier 81 and torque motor 23. Such a delay would compromise operation of a middle frequency range loudspeaker with other loudspeakers in the same system. But sources of low-frequency sounds are difficult to locate and wide latitude is available in subwoofer placement within a room. A delay of 2 milliseconds, the nominal value, is roughly the same as the delay of moving the subwoofer 2 feet away from the user, a negligible amount. The "preview" afforded by microcomputer 88 sampling the applied audio signal 89 before the delay interval permits antifriction processing to be more easily managed, e.g., if rotor assembly 58 rotation is not going to stop, none of the antifriction techniques need be applied, or, if it is going to stop, the computer data sampling rate may be increased to improve antifriction data resolution.

Torque motor cooling. A rotary acoustic radiator 22 formed of metal is a potentially efficient heat sink for the torque motor 23. Torque motor-heated air is cyclically swept into the cylinder 51 from a cabinet 26 With each cycle of the rotor assembly 58. This airflow is turbulent, hence effective in transferring torque motor 23 heat to the cylinder sidewalls 52. Though heat transfer through the movable vanes 71 and 72 to the outside environment is limited by their lightweight internal structure, the stationary vanes 62 and 63 may have high conductivity to conduct heat through themselves and to conduct heat to the cylinder sidewalls 52 and end walls 54 and 56, which walls are being swept alternately by air from the cabinet 26 and outside air. When cylinder 51 is provided with cylinder sidewall 52 user-side ports and cabinet-side end wall ports as hereinbefore described, the outside walls may be swept by pumped air. The stationary vanes 62 and 63 and cylinder 51 outside walls may be provided with fins (not shown) to provide increased surface for heat transfer and dissipation. In a large unit (750 cu. in. displacement/stroke), torque motor heat of 300 watts at full power output may be transferred and dissipated with an air temperature rise of less than 10 degrees F. Smaller units are more easily cooled because of their higher surface-to-volume ratio.

In normal operation, for a given acoustic output, air velocity is adequate to cool the torque motor 23, as air velocity is constant independent of frequency. If deadspace between rotary acoustic radiator cabinet-side ports and the armature of the torque motor 23 is small, cooling of the torque motor 23 in the upper end of its frequency range is also adequate. At lower frequencies deadspace is less important, as displaced air volume per cycle is larger. However, in a transition from extended loud to soft sound passages, stored armature heat must be dissipated or distributed into the torque motor 23 mass. When the microcomputer 88 detects such a transition as a decrease of average audio signal level, it produces an infrasonic (typically 2 or 3 Hz) vane movement of 10 to 15 percent of maximum stroke volume sufficient to cool the armature during the quiet passage.

The infrasonic movement is continued until the armature temperature is reduced to a specified temperature above ambient, typically 80 degrees F., as determined by measurement of armature resistance by microcomputer 88. The time required for temperature reduction is typically several minutes. Room-temperature torque motor armature winding resistance is determined during the startup protocol by applying a test signal to the armature. This cooling technique reduces maximum available volumetric efficiency but offers silent dissipation of torque motor 23 heat without cost or noise of additional equipment.

Bearing wear. Bearings used for oscillating loads tend to localize wear as the centered operating points of bearing surfaces are always the same. Antifriction bearings may concentrate wear unevenly over the surface of their rolling elements (balls, needles, rollers). In the present invention, which typically uses ball bearings, the microcomputer 88 generates a low amplitude infrasonic signal on line 87 which is amplified in power amplifier 81 and applied to torque motor 23. This infrasonic signal continuously shifts the operating point of the rotor assembly 58 about the centered (index) position. This movement is sufficient to assure that bearing balls are rolled over in their races every few minutes, improving wear distribution. This slow wandering reduces maximum available volumetric efficiency.

Reductions of maximum volumetric efficiency due to management of bearing breakaway friction, torque motor cooling, and bearing wear may be combined. Together they reduce momentary maximum acoustic output no more than 1.5 db. In the presence of sustained high applied audio signal levels, the duration of the reduction is only a fraction of a second as the microcomputer means 88 returns the rotor assembly 58 to the centered (index) operating point for the duration of the loud passage and for a short time, typically 15 seconds, thereafter.

From the foregoing it can be seen that the rotary acoustic transducer apparatus includes microcomputer control of movable vane centering, movable vane rotation limiting, motor cooling, and bearing wear. Microcomputer functions also include calibrating and correction of torque motor nonlinearity, air compliance nonlinearity, vane edge leakage, and bearing breakaway friction. These functions should all be distinguished from negative feedback control, usually defined as "control by sensing of the controlled variable" and usually implying sensing and controlling in the same frequency band as the useful bandwidth of the device, in this case from about 10 to 160 Hz. The useful frequency response capability below and above the 20 to 80 Hz nominal working bandwidth contributes to well-controlled user-perceived frequency response of the apparatus. Negative feedback is commonly used to reduce output distortion of audio devices and commonly associated with responses to applied audio signal input transients which include frequencies not in the input source signal.

The control approach in this invention has two broad parts: Apparatus management, and calibration and forward error correction. Apparatus management functions of centering, rotation limitation, motor cooling, and bearing wear are apparatus management functions implemented at infrasonic (i.e., below 20 Hz) frequencies well below audible frequencies and therefore not perceivable to the user. Calibration and forward correction functions, which are implemented in and above the useful bandwidth of the apparatus, use historical data stored in look-up tables in microcomputer memory to adjust the applied audio signal 89 within the microcomputer in such a fashion that the sound output of the apparatus is corrected for major sources of nonlinearity, resulting in high level of output linearity, i.e., low distortion.

The use of negative feedback is not forestalled by forward error correction. Rather the effect of forward correction is to reduce considerably the amount of negative feedback needed, if it is used, to achieve a given level of output distortion.

The rotary acoustic radiator assembly 22 of the present invention is particularly well suited for reproducing sounds in the nominal working bandwidth of 20 to 80 Hz as the dimensions of a large model of a rotary acoustic radiator, described hereinafter in particular the distance between centers of ports 64 and 66 in the first or top end wall 54 (e.g., about 9 inches), is small relative to the wavelength (approximately 14 feet) of the highest frequency to be reproduced.

With the rotary acoustic radiator assembly 22 mounted in a cabinet 26 as shown in FIG. 1 with the ports 31 and 32 in the cabinet 26 in registration with the ports 64 and 66 in the first end wall 54, air movements in cabinet ports 31 and 32 at low amplitudes fuse into a single acoustic pressure wave within a relatively short distance from the apparatus 21 even if a diffuser-attenuator is not used. At high amplitudes port exhaust plume air velocities for the ports 31 and 32 may approach 100 miles per hour in a rotary acoustic radiator assembly 22 displacing less than half a cubic foot of air per stroke. This exhaust plume is slowed in a diffuser-attenuator as shown in FIG. 1 to transform plume kinetic energy into potential energy to thereby cause fusion of the port exhaust plume energy into a single acoustic wave within a relatively short distance from the apparatus 21.

Typically there are no significant compliant members linking the stationary and moving parts of the rotary acoustic transducer apparatus. The rotor assembly 58, the torque motor 23, and the position sensing means 24 are rotatable components which are balanced about the longitudinal axis 53 so that there are no net positioning forces to move them from any rotational position. If mounted in a literally "infinite baffle," the rotatable components are without a low-frequency resonance and may be easily driven to frequencies below 1 Hz. In practice the size of a cabinet 26 and the compliance of the air within a cabinet 26, together with the movable vane area and the moment of inertia of all rotating components combined, set the low-frequency resonance of the apparatus 21. Typically this resonance is at 3 to 6 Hz, well below the audible frequency spectrum.

Volumetric efficiency, which is the percentage of the rotary acoustic radiator assembly 22 internal volume which may be swept by the movable vanes 71 and 72 in a single stroke, is limited as shown in FIGS. 2 and 3 by the thickness of movable vanes 71 and 72, stationary vanes 62 and 63, and the areas of ports 64 and 66 and 67 and 68. For the apparatus 22 the volumetric efficiency is about 60 percent, which compares favorably with less than 15 percent for a conventional low-frequency loudspeaker cone assembly. Nevertheless the largest possible volumetric efficiency is desirable, both to increase acoustic output and for certain other apparatus management and distortion reduction purposes described hereinbefore. Vane thicknesses are small and difficult to reduce. Reduction in port areas increases volumetric efficiency at the expense of increased port velocities.

Figure 4:
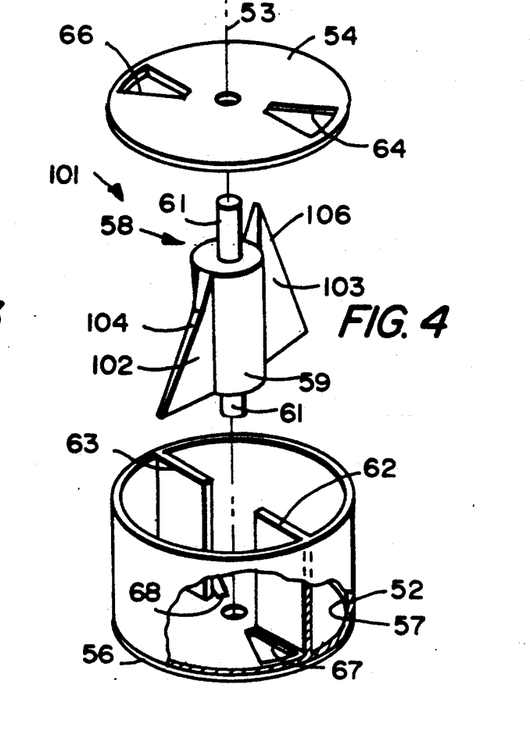

FIG. 4 shows an alternative rotary acoustic radiator assembly 101 similar to that of FIG. 3 except that the movable vanes 102 and 103 attached longitudinally at the hub 59 are formed so that the outer margins are offset or tilted clockwise in an upward direction relative to the longitudinal axis 53 of the rotary acoustic radiator 101. The vane deflection at the cylinder sidewall 52 is roughly equal to the port width at the sidewall 52, causing the movable vanes 102 and 103, when rotated to their extreme counterclockwise positions, to subtend the same angular space about the longitudinal axis 53 as the ports 67 and 68. For example, if rotor assembly 58 is rotated counterclockwise to its extreme position, the upper margin of movable vane 102 will approach the upper margin of stationary vane 62 while the lower margin of movable vane 102 approaches the left margin of port 67 as viewed in FIG. 4. Thus the movable vanes 102 and 103 travel through substantially 180°, less the total of the angles subtended by the port width, the thickness of the movable vanes 102 and 103, and the stationary vanes 62 and 63. Assuming that the port width is 30° and the vanes in total subtend 15°, the movable vane form of this FIG. 4 has the same effect on volumetric efficiency as removing one port set, and provides a gain in volumetric efficiency to about 75 percent without changing the port velocity from that of the embodiment shown in FIGS. 2 and 3.

Figure 5:
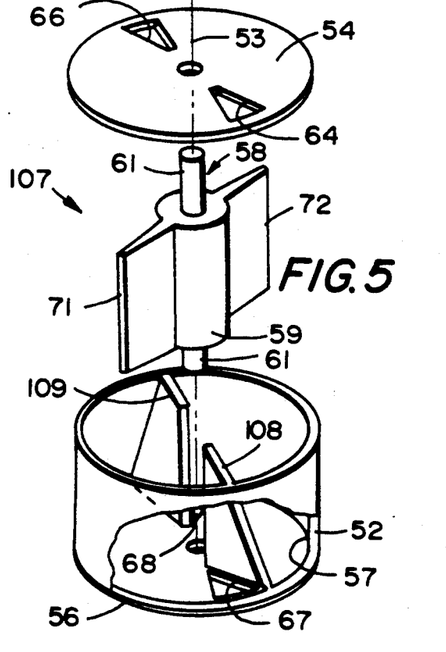

In FIG. 5 there is shown another embodiment of the rotary acoustic radiator assembly of the present invention. The radiator 107 achieves approximately the same volumetric efficiency gain as the radiator 101 in FIG. 4 by forming the stationary vanes 108 and 109 rather than the movable vanes 71 and 72 so that their inner margins are parallel to the longitudinal axis 53 and their outer margins are offset or tilted clockwise in an upward direction along the cylinder sidewall 52. This embodiment brings the ports substantially into longitudinal or vertical alignment in the same angular sectors about the axis 53, that is, ports 64 and 67 are longitudinally or vertically aligned and 66 and 68 are as well. The same port velocities and volumetric efficiency are achieved as in FIG. 4.

The air velocities through the relatively small radial ports shown in the embodiments in FIGS. 2 through 5 associated with high volumetric efficiency can be high, increasing requirements that the diffuser-attenuator, such as the diffuser-attenuator 36 shown in FIG. 1, slow the airflow presented to the user environment.

Increased velocity on the cabinet side of the apparatus due to reduced cabinet-side port area may be advantageous in effecting heat transfer from the driving torque motor 23. Increased cabinet-side port air-turbulence noise is not a significant problem because such noise can be absorbed by acoustic material (not shown) provided within a cabinet on the walls of said cabinet. Decreasing user-side port velocity by increasing port area reduces port turbulence noise.

Figure 6:
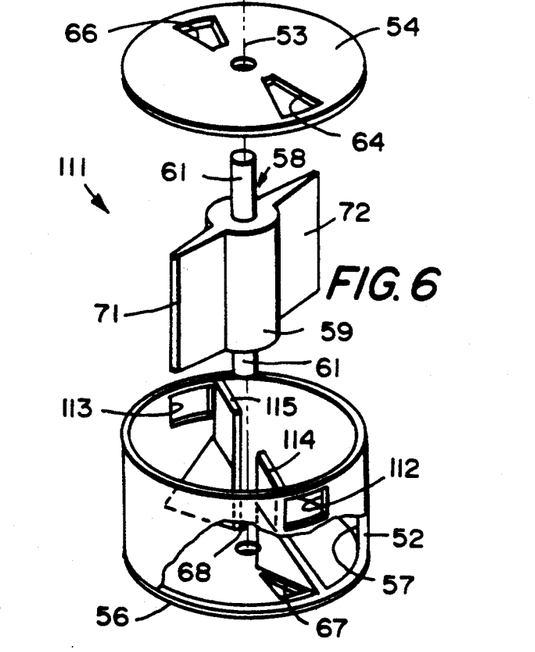

An embodiment of the rotary acoustic radiator assembly utilizing these principles is shown in FIG. 6. The rotary acoustic radiator assembly 111 has stationary vanes 114 and 115 formed much like those shown in FIG. 5, but the overall deflection along the cylinder sidewall 52 is accomplished by a localized bend in stationary vanes 114 and 115. User-side port 112 and 113 are provided in the cylinder sidewall 52 to increase total user-side port area and to reduce user-side port velocity and noise. The user-side ports 112 and 113 are disposed near the upper extremity of the side wall 52 adjacent the stationary vanes 108 and 109 and overlie the ports 67 and 68.

Figures 7, 8:
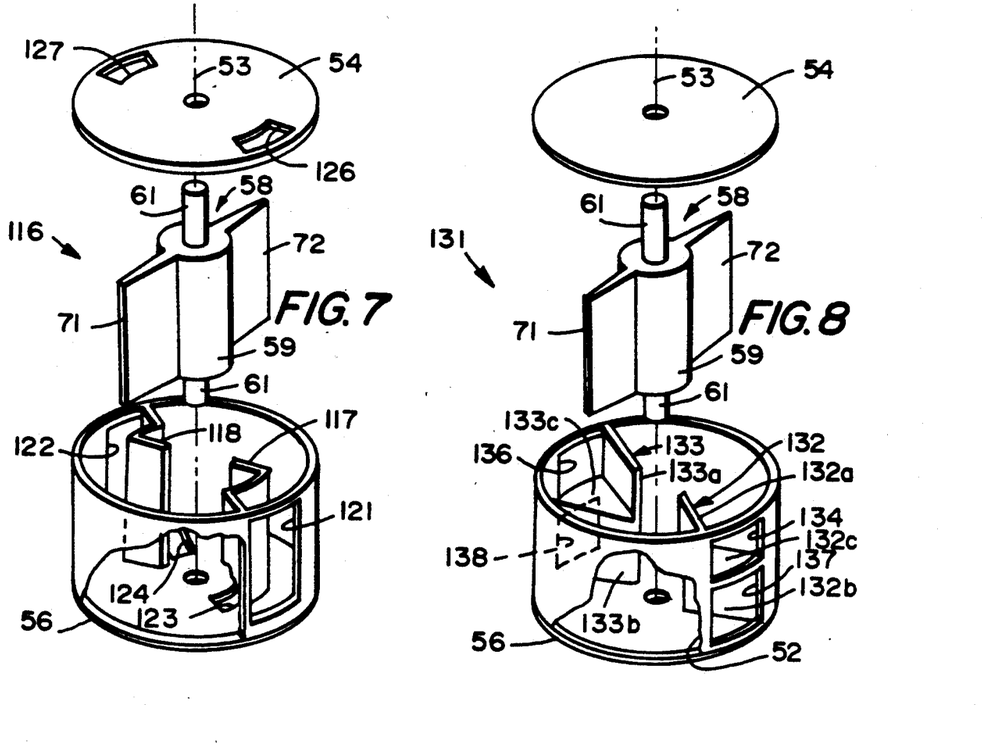

In FIG. 7, in another embodiment of a rotary acoustic radiator assembly 116, stationary vanes 117 and 118 are formed in a Z-shape in cross section which permits full length user-side ports 121 and 122 to be provided in the cylinder sidewall 52, providing the lowest user-side port velocity for a given angle subtended by ports and vanes. The cabinet-side ports 123 and 124 are reduced in area, but are well positioned to deliver cooling air to the torque motor 23. Ports 126 and 127 in the top wall 54 are reduced in area as shown to accommodate the Z-shaped stationary vanes. However, it should be appreciated that sector-shaped full area ports, as shown in FIGS. 3 through 6, may be provided in the top wall 54 by more complex formation of the stationary vanes. The combined end and side porting on the user side and end porting on the cabinet side, as shown in this FIG. 7, produces minimum user-side airflow velocity for a given displacement and volumetric efficiency and hence the quietest airflow.

The embodiment of the rotary acoustic radiator 131 shown in FIG. 8, the stationary vanes 132 and 133 have a different form, user-side and cabinet end wall ports have been eliminated and user-side rectangular ports 134 and 136 and cabinet-side rectangular port 37 and 138 are provided in the cylindrical sidewall 2. The stationary vanes 132 and 133 have upper offset portions 132a and 133a and lower offset portions 132b and 133b and intermediate adjoining portions 132c and 133c extending at right angles thereto. The ports 134 and 137 are in vertical alignment as are the ports 136 and 138. The user- and cabinet-side ports thus subtend the same angular sector about the longitudinal axis 53 of the radiator 131. The user-side ports 134 and 136 may have a vertical dimension along the axis 53 which is greater than that of the cabinet-side ports 137 and 138. Like the embodiments in FIGS. 4, 5, 6 and 7, this is a high volumetric efficiency embodiment.

The embodiments of FIGS. 2, 3, 4, 5, 6, 7 and 8 all have in common stationary vanes with the ports of one set (e.g. user-side) adjacent to one side or face of one stationary wave and a port of the other set (e.g. cabinet-side) adjacent to the other side or face of said stationary vane.

The embodiments of FIGS. 4, 5, 6, 7 and 8 have in common vanes which may be simply described as "bent" in one or more planes. All have faces exposed to the air flow with dimensions large relative to their thickness. Though, as shown, movable vanes taper in thickness linearly from root to tip and stationary vanes do not, a variety of other thickness profiles is plausible, e.g., exponential. The "bent" vanes have in common the attribute that if a large number of lines are projected from points distributed uniformly over one face of a "bent" vane through the vane to the nearest point on the opposite face of the vane, and if the midpoints of all such lines are marked, said midpoints will not lie in a single plane, that is, the software which is the locus of said midpoints is non-planar.

The edges of the ports in the embodiments hereinbefore described are provided with smooth aerodynamic surfaces to promote laminar flow through the ports and minimize port flow resistance and generation of noise which has predominantly high frequency components.

The cabinets for the embodiments of the radiators shown in FIGS. 2 through 5 may be of the same type as cabinet 26 shown in FIG. 1. The diffuser-attenuators also may be of the same type as diffuser-attenuator 36 shown in FIG. 1. The embodiment of the radiator 111 shown in FIG. 6 requires that it be raised through the cabinet top wall 28 (see FIG. 1) sufficiently to expose the sidewall ports 112 and 113. The diffuser-attenuator 36 also would be raised by a similar distance.

The rotary acoustic radiator 116 in FIG. 7 must be outside the cabinet, as for example on top of the cabinet top wall 28 of the cabinet 26 in FIG. 1, with cabinet-side ports 123 and 124 in registration with cabinet ports 31 and 32.

The rotary acoustic radiator 131 of FIG. 8 is supported in the cabinet top wall 28 so that the user ports 134 and 136 are above the cabinet top wall 28 and the cabinet side ports 137 and 138 are below the cabinet top wall 28.

All of the rotary acoustic radiator assemblies hereinbefore described have a construction which makes it easy to mount them in or on cabinets. Also, the cabinets can be of various shapes and sizes. For example, instead of a rectangular cross section, cabinets can have a circular or elliptical cross section, or they may be part of vehicular coachwork. The rotary acoustic radiator assemblies may also be operated without cabinets, as when mounted in the ceiling of a room, or in the coachwork of a vehicle so the cabinet- or back-side ports vent outside the vehicle.

Figure 9:
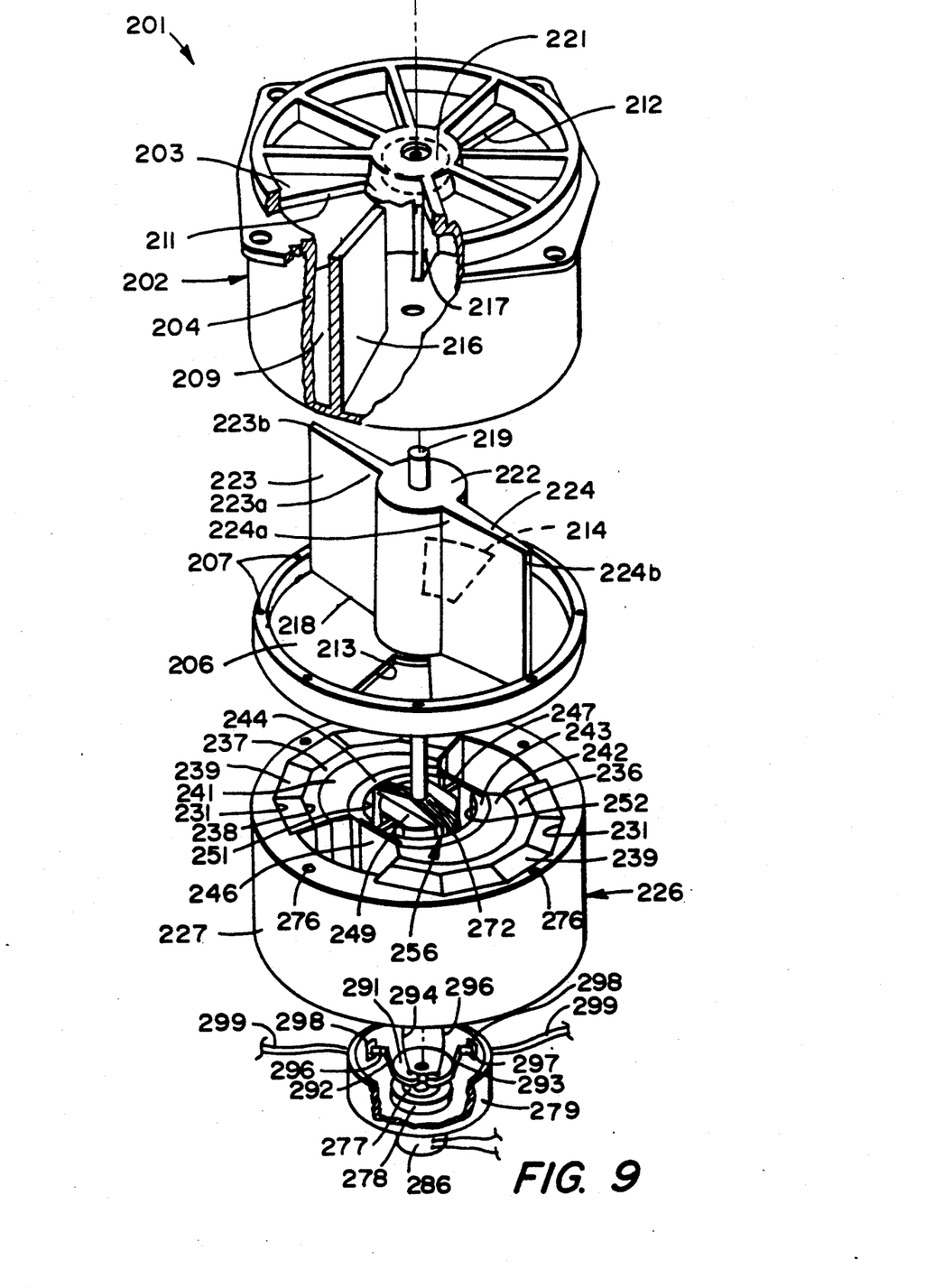
FIG. 9 is an exploded view, with certain portions broken away, of a more specific embodiment of a rotary acoustic transducer apparatus incorporating the present invention.
Figure 10:
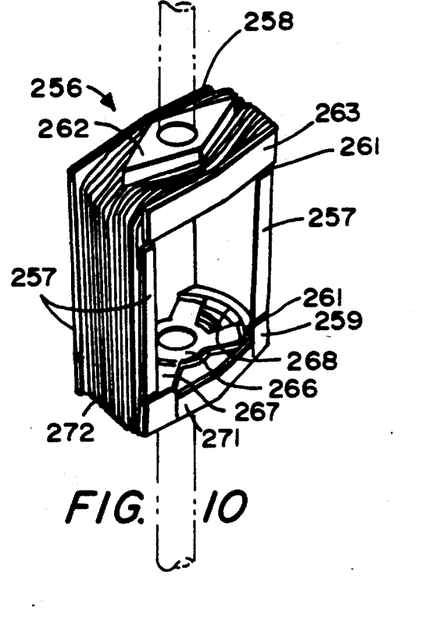
FIG. 10 is an isometric view of the armature shown in FIG. 9.

A more detailed embodiment of a sound reproducing apparatus or rotary transducer apparatus incorporating the present invention is shown in FIGS. 9 and 10. The apparatus is comprised of a rotary acoustic radiator 201 comprising a cylindrical housing 202. The housing 202 as shown has been machined from an aluminum casting to provide a radially ribbed first end wall or top wall 203 of 0.5 inch nominal thickness which is integral with a nominal 0.5 inch cylindrical side wall 204. A radially ribbed bottom or second end wall 206 of nominal 0.5 inch thickness is secured to a the side wall 204 by suitable means such as cap screws (not shown) extending through holes 207. By way of example, the enclosed or cylindrical volume 209 within the housing 202 can have a suitable size, for example a 14 inch diameter with a height of 8 inches. The top wall 203 is provided with two radially extending sector or pie-shaped user-side ports 211 and 212 whereas the bottom wall 206 has similar cabinet-side ports 213 and 214, each of the ports subtending a suitable angle such as 30°. Although the housing 202 can be mounted in any desired orientation, it is generally preferable to have the housing oriented vertically in which the first or top wall 203 overlies the second or bottom wall 206.

Radially extending stationary diametrically opposed vanes 216 and 217 are positioned within the cylindrical volume 209. These vanes 216 and 217 can be formed of 0.375 inch aluminum plate, and extend from the top wall 203 to the bottom wall 206.

A rotor assembly 218 is provided within the housing 202 and has a central axially extending shaft 219 formed of a suitable material such as aluminum. The upper end of the shaft 219 is rotatably mounted in a suitable bearing such as a sealed ABEC class 7 (very low noise) ball bearing assembly 221 mounted in the top wall 203. The rotor assembly 218 is constructed of materials so as to be relatively light in weight and so as to provide a low inertial mass. A hub 222 is mounted on the shaft 219 and has diametrically opposed radially extending vanes 223 and 224 which are secured to the hub 222. The vanes 223 and 224 are tapered in cross section in a radial direction to provide greater strength at the inner margins or roots 223a and 224a of the vanes 223 and 224. By way of example, the vanes 223 and 224 can have a thickness of ¾ inch at the roots 223a and 224a and approximately ⅜ inch at the distal margins or tips 223b and 224b. The hub 222 (e.g., 4 inches in diameter) can be formed of annealed Kevlar (trademark) foam. The movable vanes 223 and 224 can be formed of 4.5 lb. per cubic foot aluminum honeycomb core epoxy bonded to a very thin (0.003 inch) aluminum skin which forms the vane faces. Bonded skin doublers reinforce the roots 223a and 224a. In this way it is possible to distribute the stresses outwardly from the hub 222 towards the distal margins of the movable vanes 223 and 224 through the movable vane facing material.

Thus, it can be seen that the present invention in FIG. 9 utilizes two sets of at least two vanes each, one set of which is stationary, i.e., the vanes 216 and 217, and one set of vanes 223 and 224 of at least two vanes each of which is movable. The smallest desirable number of vanes in each set is two because when the movable vanes 223 and 224 are diametrically aligned this number balances the high centrifugal forces generated in each of the vanes, which cancel each other in the two vanes. In this embodiment two sets of vanes have approximately the same area.

An electric drive or torque motor 226 which is much like a large d'Arsonval galvanometer is provided for driving the rotor assembly 218 in a rotary reciprocating motion through a 110° maximum arc. The torque motor 226 consists of an outer housing 227 formed of a suitable material such as low carbon steel. The housing 227 is in the form of a cylinder or ring which has an outer diameter which corresponds to the outer diameter of the housing 202. The outer housing 227 serves as the main support for the other motor components and as a flux return path.

A plurality of five serially connected surfaces 231 are machined into opposite sides of the interior of the housing 227 and are separated by a suitable distance, as for example approximately 3 inches at the extremities of the same. The two series of five surfaces 231 serve to form a decagon which can be considered to be cut in half and separated by the 3 inches hereinbefore described. Mating flux concentrating pole pieces 236 and 237 formed of a similar material such as low carbon steel are disposed within the housing 227 and are provided with serially connected planar surfaces 238 which face the corresponding serially connected planar surfaces 231. Magnets 239 of a suitable material such as ferrite having trapezoidal upper faces are mounted between the pole pieces 236 and 237 and the surfaces 238 thereof, and the surfaces 231 of the housing 227. Thus, five magnets 239 are provided for each half of the decagon to provide a dipole field. The magnets can be of a suitable size, as for example 4 inches wide by 6 inches high by 1 inch in thickness, and have their sides beveled as shown in FIG. 9 so they fit close to each other between the surfaces 231 and 238. The magnets 239 can be held in place in a suitable manner such as by bonding the same to the surfaces 231 and 238 by a shown) formed of a suitable material such as 7075 aluminum can extend diametrically from the flux concentrators 236 and 237 through the magnets 239 and be secured to the housing 227 to further ensure that the magnets are retained in their proper locations. By way of example, four of such pins can be provided which are spaced 90° apart. The pole pieces 243 and 244 and flux concentrators 236 and 237 and 241 and 242 concentrate the magnet flux by approximately 2½ times to provide a total flux in gaps 251 and 252 of approximately 6 kilogauss. Pole pieces 243 and 244 are separated to reduce flux leakage and to ensure the flux passes through the appropriate portions of the drive motor 226.

It should be appreciated that it is possible to utilize more sophisticated magnetic materials, for example neodymium-based ferrite magnets which may make it possible to eliminate the use of the flux concentrators 236 and 237 and thereby substantially reduce the size of the motor. However, because of the lower cost of the conventional ferrite material, ferrite material has been utilized in the torque motor 226 shown in FIG. 9.

Additional semi-circular flux concentrators 241 and 242 are provided which lie adjacent the flux concentrators 236 and 237. The semi-circular pole pieces 243 and 244 of soft iron are held in spaced apart positions by T-shaped support plates 246 and 247 formed of a suitable material such as aluminum and engaging opposite extremities of the pole pieces 243 and 244. cylindrical core 249 of very pure iron of a suitable size, as for example 3½ inches in diameter and 4 inches in length. Thus, there are provided a pair of semi-circular spaces 251 and 252 between the pole pieces 243 and 244 and the central core 249.

A rotatable armature rotor 256 (see FIGS. 9 and 10) is disposed in the spaces 251 and 252 and is mounted upon the shaft 219 which extends through a hole (not shown) in the central core 249. The armature is comprised of a spaced apart parallel saddles 257 (see FIG. 10) that are U-shaped in cross section and which have "spiders" 258 and 259 disposed on opposite ends thereof but which are spaced therefrom by gaps 261 so that the spiders 258 and 259 are insulated from the saddles 257. The top spider 258 is provided with a diamond-shaped central hub 262 which is adapted to be mounted on the shaft 219. The hub 262 is disposed between upstanding sidewalls 263 formed integral with a plate (not shown) that carries the hub 262. The sidewalls 263 bulge outwardly in a broad "V". The lower spider 259 is also provided with a hub 266 and is mounted on and is supported by four radially extending spring spokes 267 adjoining arcuate crosspieces 268 at their distal extremities. The crosspieces 268 have mounted thereon depending V-shaped structures (not shown) which abut the hub 266 to provide a diamond-shaped structure similar to the diamond-shaped hub 262. The spider 259 is also provided with upstanding spaced apart sidewalls 271 in the same manner as sidewalls 263 which also bulge slightly outwardly in a broad "V".

The saddles 257 and the spiders 258 and 259 are supported in a jig (not shown) to provide appropriate spacing, and then have wound thereon an insulated conductor to provide a winding 272. The jig is then removed. The armature rotor 256 preferably has a length which is greater than its width, as for example it can have a length of 6 inches and a width of 4½ inches, and is wound with a suitable conducting wire such as 16-gauge insulated aluminum wire. The wire is wound so that it extends over the spiders 258 and 259 on opposite sides of the hubs 262 and 266 between the spaced apart V-shaped sidewalls 263 and 271 and into the saddles 257. By way of example, in one embodiment of the invention approximately 390 turns were utilized in the armature rotor winding 272. The conducting wires are then held in place by a fiberglass-filled epoxy. The sidewalls 263 and 271 serve to prevent the winding 272 from spreading apart, whereas the diamond-shaped structures associated with the hubs 262 and 266 serve to prevent the windings from collapsing inwardly.

The spring spokes 267 of the spider 259 are approximately 1000 times more compliant axially than they are tangentially. They serve to transfer torque from the winding 272 to the hub 266 while being able to flex longitudinally of the torque motor rotational axis as the winding 272 expands and contracts with changing power input without having any tendency for the armature saddles 257 legs 267 to bow outwardly and touch the pole pieces 243 and 244. The thin (0.014 inch) longitudinal aluminum saddles 257 are bonded to the inner and side surfaces of the armature winding 272 to stiffen the armature winding 272 against lateral deflection during acceleration.

The torque motor housing 227 is secured to the bottom plate 206 by suitable means such as four through bolts (not shown) spaced 90° apart and extending through holes 276 in the housing 227. The shaft 219 extends beyond the armature rotor 256 and is rotatably mounted in a lower bearing assembly 277 and of the same type as bearing assembly 221. The bearing assembly 277 is wall of a bearing support housing 279 secured to the lower faces of the pole pieces 243 and 244 by bolts (not shown).

A position sensor 286 is coupled to the shaft 219 and is secured to the lower bearing housing 279. The position sensor 286 senses rotation of the armature 256 which can travel through a suitable angle, as for example 110°. It has a resolution of about 125 bits per degree of rotation. The information from the position sensor 286 can be utilized for providing velocity information or acceleration information for controlling the torque motor 226. The position sensor also provides centering or indexing information.

Power is supplied to the armature 256 through a capstan 291 mounted on the shaft 219 above the bearing 277. The capstan 291 is formed of a suitable insulating material such as Delrin. Flexible conducting foil strips 292 and 293 formed of a suitable spring-like, fatigue-resistant conducting material such as a 0.004 inch thick beryllium copper each have one of their ends mounted in spaced apart separate slots in the capstan 291. The strips 292 and 293 are connected by leads 294 and 296 which extend from the capstan 291 and are connected to opposite ends of the winding 272 of the armature 256. At rest, the strips 292 and 293 each subtend approximately 90° on the capstan 291 and are connected to conductive fishing pole-like tensioning leaf springs 296 and 297 about 1.5 inches long, formed of thicker (0.018 inch) beryllium copper. The leaf springs 296 and 297 are mounted in insulating support blocks 298 mounted in the lower bearing housing 279. Leads 299 connected to the leaf springs 296 and 297 extend from the support blocks 298 and are connected to the microcomputer-adjusted applied audio signal from the power amplifier. The leaf springs 296 and 297 have sufficient length so that they can accommodate somewhat more than the 110 reciprocating rotational movement of the armature 256 as it travels through its maximum excursions.

The operation of the embodiment of invention shown in FIGS. 9 and 10 is very similar to that hereinbefore described in conjunction with the embodiment shown in FIGS. 1 and 2. The movable vanes 223 and 224 which are fastened to the shaft 219 and hub 222 are driven in rotary reciprocation that follows the microcomputer-adjusted audio signal applied to the torque motor 226. The distal margins 223b and 224b of the movable vanes 223 and 224 are very close to the internal wall of the housing 202 so that as they move they sweep substantially all of the radial projection of the housing 202 excepting the area of the shaft 219 and hub 222 at any point in their rotation. The inner margins of the stationary vanes 216 and 217 are also very close to the hub 222 carrying the movable vanes 223 so that the small gaps therebetween function as seals because the leakage is very small in comparison to the air which is transported through the ports 211 and 212 and the ports 213 and 214.

It should be appreciated that if it is desired to provide a still better seal, labyrinth-type seals can be utilized between the stationary vanes 216 and the hub 222. A flexible material such as fabric or rubber connecting stationary vanes 216 and hub 222 may also be used, although a flexible material provides a compliance which will create or modify the low-frequency resonance of the rotary acoustic radiator assembly. Distortion of reproduced sounds may also occur.

The surfaces of the stationary vanes 216 can be provided with sound absorption materials (not shown) to absorb the relatively high frequency sounds of seal leakage and port turbulence. The thickness of this material may be significant relative to the port width as long as this material is relieved near the ports so that air flow through the ports is not impeded. Such acoustic material also may serve as an effective shock absorbing crash barrier for the movable vanes should they overrun their normal maximum excursion. Also, the surfaces of the movable vanes may be covered or patterned with viscoelastic materials (not shown) for damping of possible high frequency (several hundred Hertz) natural resonances and from the sounds originating in the bearings and to provide minor amounts of sound absorption for seal and port noises.

The bearings as hereinbefore described should be as quiet as possible because the cylindrical means, the stationary and movable vanes serve as efficient low-dissipation sound radiators. The loads on the bearings are small because the motor armature, motor shaft, and rotor assembly are statically and dynamically balanced unless there is asymmetric dynamic loading due to port obstruction.

In operation the foil strips 293 and 293 roll smoothly on and off the capstan 291 as the shaft 219 rotates. They make no acoustic noise perceptible with the rotary acoustic radiator 201 operating and no electrical noise at all. The torques of the two lead assemblies counteract each other, placing no net positioning torque on the shaft 219. With this construction there are no commutating brushes or slip rings to wear and create noise and distortion. If greater rotational excursion is required for a very high volumetric efficiency rotary acoustic radiator assembly, the foil and tensioning leaf spring assemblies can be displaced from the same radial plane (as shown in FIG. 9) by moving one assembly longitudinally relative to the rotational axis of the armature 256 and securing the capstan ends of the foils 292 and 293 so they lie beside each other for some angular distance about the circumference of the capstan 291.

The torque motor 226 has a ratio of full torque to worst-case breakaway torque from all sources, including bearing grease seals, of about 1000:1. This compares very favorably with about 40:1 for brush-commutated high-quality basket-wound motors. The difference reflects the two motors' respective propensity to distort low level audio output of the rotary acoustic transducer assembly.

Figure 11:
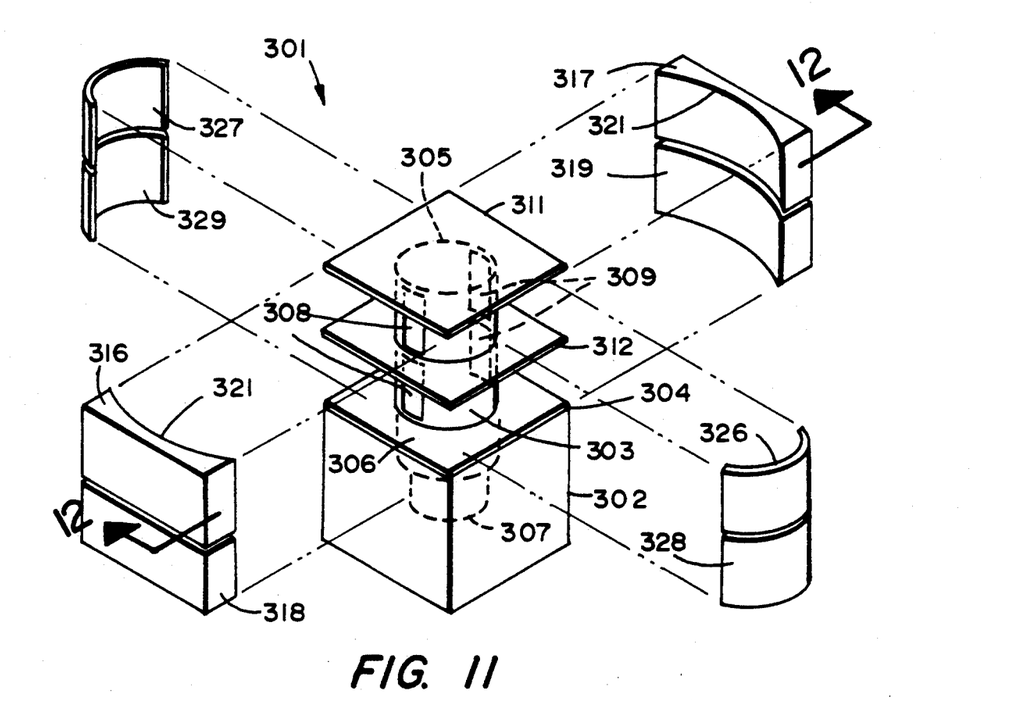
FIG. 11 is a partially exploded, isometric view of an alternative loudspeaker cabinet and diffuser-attenuator incorporating certain aspects of the rotary acoustic transducer apparatus of the present invention.
Figure 12:
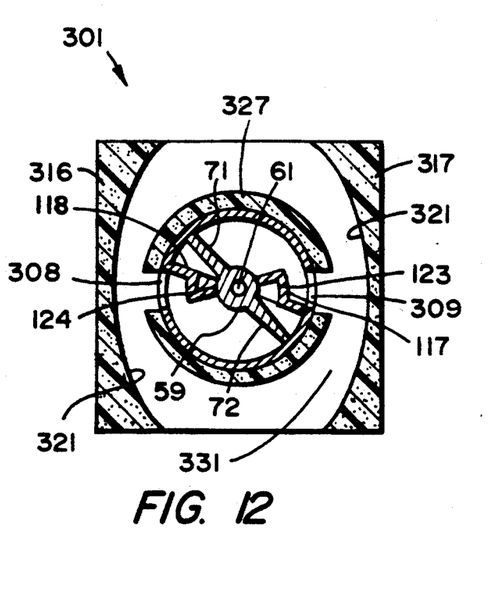
FIG. 12 is a cross sectional view taken along the line 12—12 of FIG. 11 but in an unexploded condition.

In FIG. 11 there is shown a diffuser-attenuator 301 suitable for the rotary acoustic radiator assembly 116 of FIG. 7 and rotary acoustic radiator assembly 131 of FIG. 8. Assuming that the radiator 116 in FIG. 7 is used, the radial sector user-side end ports 126 and 127 are not used but user-side ports 121 and 122 in the cylinder sidewall 52 are used. The cabinet 302 is like cabinet 26 shown in FIG. 1. Cabinet ports (not shown) register with the bottom end wall ports 123 and 124 in the rotary acoustic radiator assembly 116. In FIG. 12 the rotary acoustic radiator assembly 305 is mounted external to the cabinet 302 on top of the cabinet top wall 304 while the torque motor 306 and the position sensor 307 are mounted within the cabinet 302. The top baffle 311 is mounted above the top of the cabinet 302 by bolts and spacers (not shown). An intermediate baffle 312 is mounted over the rotary acoustic radiator assembly 305 and is secured to the cabinet 302 by bolts and spacers (not shown) and roughly divides the user-side ports 308 and 309 horizontally in half. Baffles 311 and 312 may be mounted to the rotary acoustic radiator assembly 305 to improve sinking of torque motor 307 heat. Diffuser-attenuator air duct wall components 316, 317, 318 and 319 are provided and are bonded between the surfaces of the top of the cabinet 302, intermediate baffle 312, and top baffle 311. The components 316-319 are provided with outer surfaces which are nominally in alignment with the outer margins of the baffles 311 and 312 as well as of the cabinet 302 (see FIG. 12). The components 316-319 are provided with arcuate surfaces 321 which are opposite the ports 308 and 309 and are spaced therefrom. Arcuate blanket components 326, 327, 328 and 329 are bonded to the outside surface of the rotary acoustical radiator assembly 305 between the horizontal margins of ports 308 and 309 and the top of the cabinet 306, intermediate baffle 312 and the top baffle 311. Together these diffuser-attenuator components effectively create eight air ducts 331 with throats at the user-side ports 308 and 309 and mouths at the edges of the top of the cabinet 302, intermediate baffle 312 and top baffle 311. It should be appreciated that additional intermediate baffles and corresponding air duct wall components may be used if desired. For a small rotary acoustic radiator assembly, the diffuser-attenuator 301 may be built without an intermediate baffle. If user-side end ports are included in the rotary acoustic radiator assembly, additional components can be provided for the diffuser-attenuator, like those in FIG. 1. The diffuser-attenuator means may include screens or filters (not shown) to shield the parts of the rotary acoustic radiator assembly from foreign bodies and also to protect users.

In general, the apparatus of the present invention can be characterized as a rigidly structured microcomputer-controlled transducer comprised of rigid composite vanes rotating in a rigid ported cylinder which is capable of reproducing sound with a low distortion from its high frequency crossover point of 80 Hz down to well below the 20 Hz lower limit of the audio frequency spectrum. Even in a small cabinet, the frequency response in and immediately below its working bandwidth is substantially flat and without resonances without negative feedback.

What is claimed is:

1. A rotary acoustic transducer apparatus for producing sound in response to an applied audio signal, comprising a rotary acoustic radiator assembly, a torque motor, a position sensor, and a microcomputer, said rotary acoustic radiator assembly comprising a generally cylindrical means with a cylindrical sidewall and end walls forming a cylindrical chamber having an axis, a shaft, bearings mounting said shaft in said cylindrical means for rotation about said axis, a cylindrical hub secured to said shaft and extending between said end walls, movable vanes secured to said shaft, said shaft, said hub, and said movable vanes forming a rotor assembly, stationary vanes mounted in said chamber between said moving vanes and extending between said cylindrical sidewall and said hub and between said end walls, said cylindrical means having ports opening through the walls of said cylindrical chamber to direct air flow into and out of the cylinder in response to movement of the movable vanes, a torque motor coupled to the shaft applying rotational reciprocating movement to the rotor assembly, a position sensor for ascertaining the position of said rotor assembly, and means coupling said microcomputer to said torque motor and to said position sensor to control the operations of said torque motor by applying a drive signal in accordance with the applied audio signal and corrections thereto derived by said microcomputer.

2. Apparatus as in claim 1 for use in a user environment together with a cabinet in the user environment and means of mounting said rotary acoustic radiator assembly so that it is carried by said cabinet and that certain of said ports open into the cabinet and certain of said ports open externally of the cabinet and produce an air flow into and out of the user environment.

3. Apparatus as in claim 1 for use in a user environment together with a diffuser attenuator means disposed in the vicinity of said rotary acoustic radiator for redirecting and slowing air flow to and from ports opening into the user environment.

4. Apparatus as in claim 3 wherein the diffuser attenuator means includes acoustic absorbent material to reduce noise in the air flow passing through the diffuser attenuator.

5. Apparatus as in claim 1 wherein the microcomputer includes means for generating a centering signal in the drive signal to the torque motor for maintaining the average position of the rotor assembly in the center of its rotational travel arc limits.

6. Apparatus as in claim 5 wherein the microcomputer includes means for generating an infrasonic signal to modulate the centering signals in the drive signal to the torque motor so that the operating center of said torque motor and rotor assembly wanders slowly about an index position to distribute bearing wear.

7. Apparatus as in claim 1 wherein the microcomputer includes means for preventing contact of the moving vanes of the rotor assembly and the stationary vanes by operating on the applied audio signal.

8. Apparatus as in claim 1 wherein the microcomputer includes means for calibrating motor torque linearity as a function of rotational position and for operating on the applied audio signal to compensate for any torque motor nonlinearity.

9. Apparatus as in claim 1 wherein the microcomputer includes means for measuring air compliance as a function of the position of the rotor assembly and operating on the applied audio signal to compensate for any air compliance nonlinearity.

10. Apparatus as in claim 1 wherein the microcomputer includes means for measuring air leakage as a function of rotor assembly position and operating on the applied audio signal to compensate for the leakage.

11. Apparatus as in claim 1 wherein the microcomputer includes means for measuring bearing breakaway friction as a function of extent and velocity of bearing rotation prior to stop and duration of the bearing stop at local peaks of the applied audio signal waveform, and operating on the applied audio signal to provide a drive signal to the torque motor which produces torque when bearing rotation resumes to overcome the bearing breakaway friction.

12. Apparatus as in claim 1 wherein the microcomputer includes means for providing an infrasonic signal in the drive signal to the torque motor to continue bearing rotation at local audio waveform peaks to forestall extended bearing non-rotation.

13. Apparatus as in claim 1 wherein the microcomputer means provides an audio signal delay of a few milliseconds to facilitate bearing breakaway friction management by sampling and assessing the applied audio signal prior to their being supplied to the torque motor by the microcomputer.

14. Apparatus as in claim 1 wherein the microcomputer includes means for sensing torque motor armature temperature and cooling the torque motor by providing an infrasonic signal in the drive signal to the torque motor to produce infrasonic oscillation of the rotor assembly.

15. A rotary acoustic radiator assembly for producing sound in response to a reciprocating rotational movement of a torque motor driven by an audio signal, said rotary acoustic radiator assembly comprising a generally cylindrical means with a cylindrical sidewall and end walls forming a cylindrical chamber having an axis, a shaft, bearings mounting said shaft in said cylindrical means for rotation about said axis, a cylindrical hub secured to said shaft and extending between said end walls, movable vanes secured to said shaft, said shaft, said hub, and said movable vanes forming a rotor assembly, stationary vanes mounted in said chamber between said moving vanes and extending between said cylindrical sidewall and said hub and between said end walls, said cylindrical means having ports opening through the end walls of said cylindrical chamber adjacent to each therewith a port in an end wall on one side of said stationary vane and a port in the other end wall on the other side of said stationary vane to permit air flow into and out of the cylinder in response to movement of the movable vanes.

16. A rotary acoustic radiator assembly for producing sound in response to a reciprocating rotational movement of a torque motor driven by an audio signal, said rotary acoustic radiator assembly comprising a generally cylindrical means with a cylindrical sidewall and end walls forming a cylindrical chamber having an axis, a shaft, bearings mounting said shaft in said cylindrical means for rotation about said axis, a cylindrical hub secured to said shaft and extending between said end walls, movable vanes secured to said shaft, said shaft, said hub, and said movable vanes forming a rotor assembly, stationary vanes mounted in said chamber between said moving vanes and extending between said cylindrical sidewall and said hub and between said end walls, said cylindrical means having ports opening through the end walls of said cylindrical chamber adjacent to each stationary vane, each stationary vane having associated therewith a port in an end wall on one side of said stationary vane and a port in the other end wall on the other side of said stationary vane to permit air flow into and out of the cylinder in response to movement of the movable vanes, said cylindrical means including additional ports formed in the cylindrical sidewall adjacent to each stationary vane.

17. A rotary acoustic radiator assembly for producing sound in response to a reciprocating rotational movement of a torque motor driven by an audio signal, said rotary acoustic radiator assembly comprising a generally cylindrical means with a cylindrical sidewall and end walls forming a cylindrical chamber having an axis, a shaft, bearings mounting said shaft in said cylindrical means for rotation about said axis, a cylindrical hub secured to said shaft and extending between said end walls, movable vanes secured to said shaft, said shaft, said hub, and said movable vanes forming a rotor assembly, stationary vanes mounted in said chamber between said moving vanes and extending between said cylindrical sidewall and said hub and between said end walls, said cylindrical means having ports opening through the cylindrical chamber adjacent to each stationary vane, each stationary vane having associated therewith a sidewall port on one side of said stationary vane and an end wall port on the other side of said stationary vane to permit air flow into and out of the cylinder in response to movement of the movable vanes.

18. A rotary acoustic radiator assembly for producing sound in response to a reciprocating rotational movement of a torque motor driven by an audio signal, said rotary acoustic radiator assembly comprising a generally cylindrical means with a cylindrical sidewall and end walls forming a cylindrical chamber having an axis, a shaft, bearings mounting said shaft in said cylindrical means for rotation about said axis, a cylindrical hub secured to said shaft and extending between said end walls, movable vanes secured to said shaft, said shaft, said hub, and said movable vanes forming a rotor assembly, stationary vanes mounted in said chamber between said moving vanes and extending between said cylindrical sidewall and said hub and between said end walls, said cylindrical means having ports opening through at least certain of the end walls and the sidewall and into said cylindrical chamber to permit air flow into and out of the cylindrical chamber in response to movement of the movable vanes, certain of said ports in the cylindrical chamber walls being at least partially superposed in the same angular sector about the axis.

19. A rotary acoustic radiator assembly for producing sound in response to a reciprocating rotational movement of a torque motor driven by an audio signal, said rotary acoustic radiator assembly comprising a generally cylindrical means with a cylindrical sidewall and end walls forming a cylindrical chamber having an axis, a shaft, bearings mounting said shaft in said cylindrical means for rotation about said axis, a cylindrical hub secured to said shaft and extending between said end walls, movable vanes secured to said shaft, said shaft, said hub, and said movable vanes forming a rotor assembly, stationary vanes mounted in said chamber between said moving vanes and extending between said cylindrical sidewall and said hub and between said end walls, said cylindrical means having certain ports opening through an end wall of said cylindrical chamber to permit air flow into and out of the cylindrical chamber in response to movement of the movable vanes, said certain ports being arranged so that air flow therethrough passes through said torque motor for cooling the torque motor.

20. In a rotary acoustic transducer apparatus for producing sound in response to an applied audio signal, comprising a rotary acoustic radiator assembly and a torque motor, the rotary acoustic radiator assembly comprising a generally cylindrical means with a cylindrical sidewall and end walls forming a cylindrical chamber having an axis, a shaft, bearings mounting said shaft in said cylindrical means for rotation about said axis, a cylindrical hub secured to said shaft and extending between said end walls, movable vanes secured to said shaft, said shaft, said hub, and said movable vanes forming a rotor assembly, stationary vanes mounted in said chamber between said moving vanes and extending between said cylindrical sidewall and said hub and between said end walls, said cylindrical means having ports opening through at least certain of the walls to permit air flow into and out of the cylinder in response to movement of the movable vanes, said torque motor coupled to the shaft applying rotational reciprocating movement in accordance with an applied audio signal, said torque motor including a torque motor shaft and an armature mounted on the shaft and a capstan formed of an insulating material mounted on said torque motor shaft, first and second conducting metal foil strips secured to said capstan at separate positions thereon having first ends connected to said armature and having second ends supported and tensioned individually by conductive leaf springs so that the capstan may rotate over a limited range while maintaining electrical continuity through said metal foil strips and leaf springs, and means connecting said leaf springs to the applied audio signal.

21. A rotary acoustic transducer for producing sound in response to an audio signal in a user environment, comprising a rotary acoustic radiator assembly and torque motor, the rotary acoustic radiator assembly comprising a generally cylindrical means with a cylindrical sidewall and end walls forming a cylindrical chamber having an axis, a shaft, bearings mounting said shaft in said cylindrical means for rotation about said axis, a cylindrical hub secured to said shaft and extending between said end walls, movable vanes secured to said shaft, said shaft, said hub, and said movable vanes forming a rotor assembly, stationary vanes mounted in said chamber between said moving vanes and extending between said cylindrical sidewall and said hub and between said end walls, said cylindrical means having ports opening into said cylindrical chamber and into the user environment to permit air flow into and out of the cylindrical chamber in response to movement of the movable vanes, said torque motor being coupled to said shaft and applying rotational reciprocating movement in accordance with the applied audio signal and diffuser attenuator means disposed in the vicinity of said acoustic radiator for redirecting and slowing air flow into and from ports opening into the user environment.

22. Apparatus as in claim 21 wherein the diffuser attenuator means includes acoustic absorbent material to reduce noise in the air flow passing through the diffuser attenuator.

23. In a method for producing low frequency sound from an applied audio signal by the use of a rotary acoustic transducer apparatus comprising an enclosure providing a cylindrical chamber having one set of stationary vanes mounted therein and having a rotor assembly mounted therein having one set of movable vanes mounted thereon, the enclosure having ports therein in communication with the cylindrical chamber, torque motor means coupled to said rotor assembly for causing rotary reciprocating movement of said rotor assembly, and a microcomputer for receiving the applied audio signal and for supplying a drive signal to the torque motor means, the microcomputer having a memory with at least one table of information having values stored therein related to a physical characteristic of the rotary acoustic transducer apparatus including rotor assembly position, the method comprising the steps of causing the microcomputer to sense the position of the rotor assembly and to read values from said at least one table, and utilizing the sensed rotor assembly position and the read values from said at least one table to control the operation of the rotor assembly.

24. A method as in claim 23 together with the step of measuring physical characteristics of the rotary acoustic transducer apparatus and creating additional tables in microcomputer memory for reference during rotary acoustic transducer apparatus operation.

25. A method as in claim 24 together with the step of updating said additional tables in microcomputer memory during operation for reference during rotary acoustic transducer apparatus operation.

26. A method as in claim 25 wherein bearing means is provided for rotatably mounting the rotor assembly, said bearing means having breakaway friction, together with means for measuring the bearing breakaway friction as a function of the extent and velocity of rotation of the bearing prior to stop, together with the step of causing the microcomputer to measure the bearing breakaway friction and operating on the applied audio signal to provide torque when the bearing rotation resumes to overcome the breakaway friction.

27. A method as in claim 25 together with the step of causing the microcomputer to cause generation of an infrasonic signal in the drive signal to the torque motor to continue bearing rotation at local audio waveform peaks to forestall extended bearing non-rotation.

28. A method as in claim 25 together with the step of causing the microcomputer to provide a delay in the drive signal supplied to the torque motor to facilitate bearing breakaway friction management by sampling and assessing the applied audio signal prior to its being supplied to the torque motor.

29. A method as in claim 25 together with the step of causing the microcomputer to sense torque motor armature temperature and to generate an infrasonic signal in the drive signal in response to the measured armature temperature to produce infrasonic oscillation of the rotor assembly for cooling the torque motor.

30. A method as in claim 24 together with the step of causing the microcomputer to calibrate the linearity of the torque from the torque motor as a function of rotational position of the torque motor and operate on the applied audio signal to compensate for any nonlinearity in the torque motor.

31. A method as in claim 24 for use in cabinetry together with the step of causing the microcomputer to measure air compliance in the chamber and the cabinetry as a function of the position of the rotor assembly and operate on the applied audio signal to compensate for any nonlinearities in the air compliance.

32. A method as in claim 24 together with the step of causing the microcomputer to measure vane and air leakage as a function of rotor assembly position and operate on the applied audio signal to compensate for any measured leakage.

33. A method as in claim 23 together with the step of causing the microcomputer to generate centering signals in the drive signal to the torque motor to maintain the average position of the rotor assembly in the center of its rotational arc limits.

34. A method as in claim 33 together with the step of causing the microcomputer to generate an infrasonic signal to modulate the centering signals in the drive signal for the torque motor and rotor assembly so that the operating center of the rotor assembly wanders slowly to distribute bearing wear.

35. A method as in claim 23 together with the step of causing the microcomputer to prevent contact of the movable vanes of the rotor assembly and the stationary vanes by operating on the applied audio signal.

36. In a method for producing low frequency sound by the use of an applied audio signal by the use of one set of stationary vanes and one set of movable vanes mounted in a cylindrical housing having at least one end wall having end ports therein, said method comprising moving the movable vanes in the housing in accordance with the applied audio signal to cause the movable vanes to move towards and away from the stationary vanes to cause air flow to pass rapidly into and out of the end ports to create low frequency sound.

37. In a method for producing low frequency sound by the use of an applied audio signal by the use of one set of stationary vanes and one set of movable vanes mounted in a cylindrical housing having at least one end wall having end ports therein, said method comprising moving the movable vanes in the housing in accordance with the applied audio signal to cause the movable vanes to move towards and away from the stationary vanes to cause air flow to pass rapidly into and out of the end ports to create low frequency sound and slowing and redirecting the air flow into and out of certain of said ports.

38. A method as in claim 37 together with the step of absorbing high frequency noise from the air flow into and out of the ports.

39. A method as in claim 37 together with the step of screening the air flow into the ports.

* * * * *